United States Patent [19]
Forster et al.

[11] 3,884,038
[45] May 20, 1975

[54] CONTROL SYSTEM FOR A PRIME MOVER CONNECTED TO A STEPLESS TRANSMISSION

[75] Inventors: Franz Forster, Haibach; Hans-Waldemar Stuhr, Aschaffenburg, both of Germany

[73] Assignee: Linde Aktiengesellschaft, Wiesbaden, Germany

[22] Filed: Jan. 30, 1974

[21] Appl. No.: 437,885

[30] Foreign Application Priority Data
Feb. 2, 1973 United Kingdom................ 5287/73

[52] U.S. Cl..................................... 60/431; 60/435
[51] Int. Cl............................................ F16h 39/46
[58] Field of Search ............ 60/325, 431, 435, 448, 60/449, 451, DIG. 2; 74/664, 731; 417/1, 15

[56] References Cited
UNITED STATES PATENTS

| | | | |
|---|---|---|---|
| 1,244,878 | 10/1917 | Manly | 60/451 |
| 2,370,710 | 3/1945 | Blair | 60/449 X |
| 3,284,999 | 11/1966 | Lease | 60/431 |
| 3,371,479 | 3/1968 | Yapp et al. | 60/451 X |

*Primary Examiner*—Edgar W. Geoghegan
*Attorney, Agent, or Firm*—Karl F. Ross; Herbert Dubno

[57] ABSTRACT

A torque-responsive device is provided between the output shaft of a prime mover such as an internal-combustion engine or electric motor, and the input (driven) shaft of a stepless transmission (e.g. a hydrostatic drive) and controls the prime mover so that, when the loading of the prime mover reaches a limiting value, the ratio of the stepless transmission is varied to reduce its output speed.

25 Claims, 10 Drawing Figures

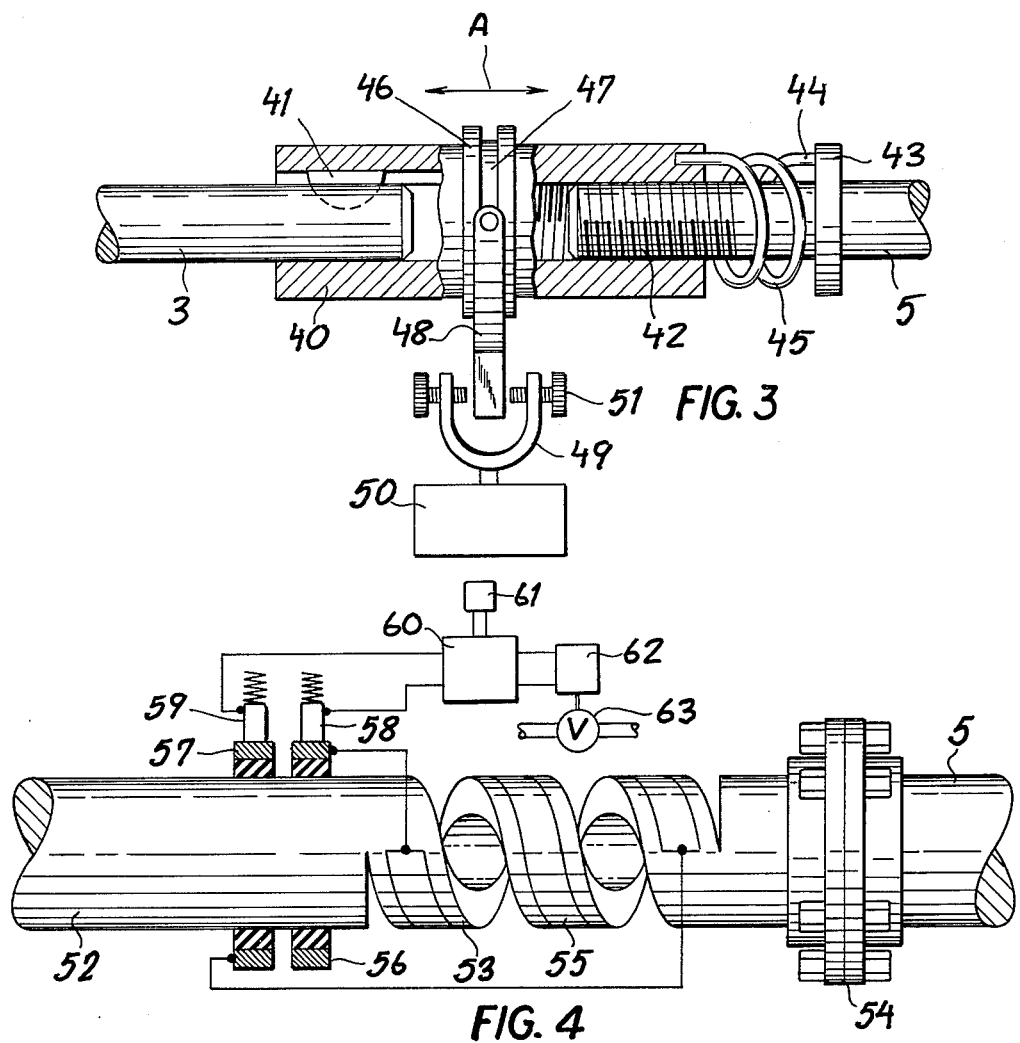
FIG. 3
FIG. 4
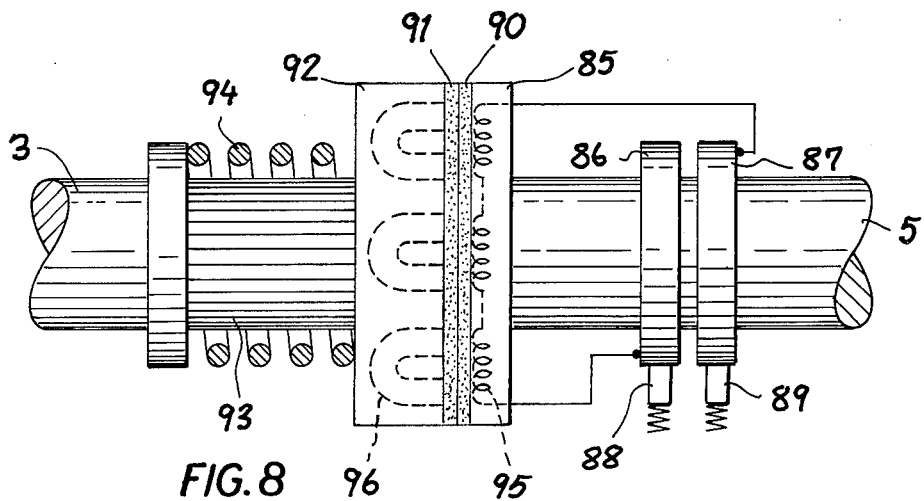
FIG. 8

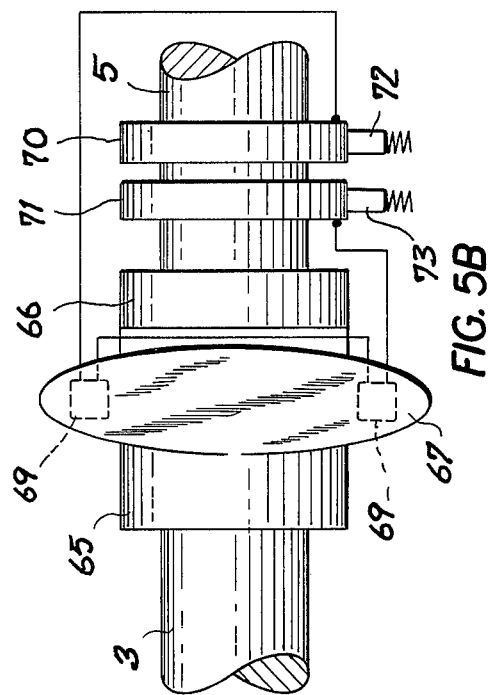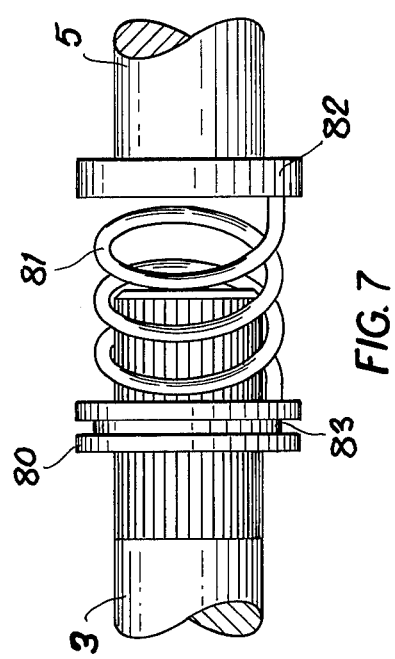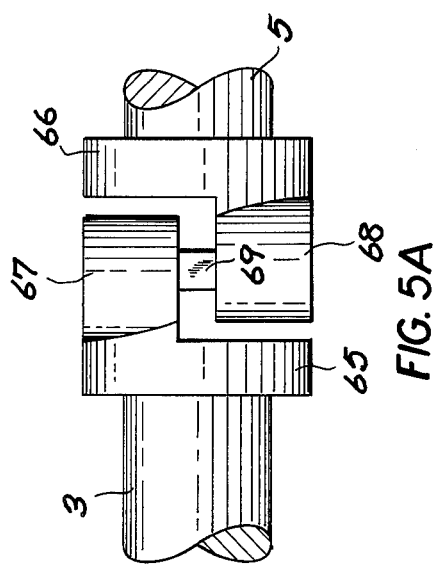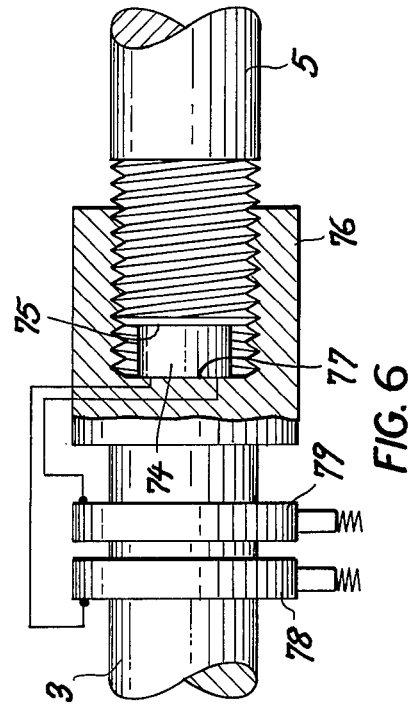

ived energy source and a hydrostatic drive in the manner indicated requires the monitoring by an operator of the system and his selective movement of the transmis-

CONTROL SYSTEM FOR A PRIME MOVER CONNECTED TO A STEPLESS TRANSMISSION

FIELD OF THE INVENTION

The present invention relates to a control system for a prime mover and stepless transmission designed to prevent overloading and, more particularly, to a system which includes a prime mover such as an internal-combustion engine or electric motor and a stepless transmission such as a hydrostatic drive.

BACKGROUND OF THE INVENTION

It is a common practice to provide a prime mover, i.e. a device for transforming energy from a fuel or an electric line into mechanical work, and a stepless transmission so that a load can be operated at variable speeds. In such systems, the prime mover may be an internal-combustion engine, e.g. a gasoline or diesel engine, and the stepless transmission may be a hydrostatic drive. A hydrostatic drive generally comprises an axial-piston pump having a variable effective stroke and driven by the prime mover, the pump being hydraulically connected in turn to one or more axial-piston motors whose shaft or shafts are connected to a load.

A typical use of such a system is in an automotive vehicle in which the wheels are driven by the axial-piston motor and the primary power source has a crankshaft which is connected to the input or pump shaft of the hydrostatic drive.

Another application of such a system is a conveyor drive in which a belt, chain or other conveyor system has a roller, sprocket or pulley operatively connected to a hydraulic motor which communicates by ducts, passages or the like of great or limited length with a hydraulic pump which is driven by a prime mover or other power source, say a diesel engine or an electric motor.

The transmission ratio is altered by varying the effective stroke of the pump, i.e. by tilting a control plate or swash plate so that the pistons of an annular array of cylinders parallel to the axis of the shaft are caused to have a greater or smaller excursion.

It is a common practice manually to control a system consisting of a primary engine source and a stepless transmission connected thereto whereby, upon overloading of the primary energy source or the attainment of a predetermined limiting load therefor, the steplessly adjustable transmission is varied in ratio to reduce its output speed, i.e. to lower the rotary speed of its output shaft. When the transmission operates a substantial load such that a constant torque is applied at the output shaft or the torque drops with the reduction in speed of the output shaft, the reduction in the rotary speed of the output shaft results in a reduction of the torque requirements at the input shaft of the transmission and hence reduces the load or drag upon the primary energy source.

Such a control technique has been found to be especially significant for internal-combustion machines and especially piston-type internal-combustion engines and with electric motors since efficiency of such primary energy sources falls off sharply when they are operated below their rated speeds or above their rated torques.

Of course the conventional means for adjusting a system consisting of an internal-combustion engine or another energy source and a hydrostatic drive in the manner indicated requires the monitoring by an operator of the system and his selective movement of the transmission control element to prevent overloading of the engine.

In some automotive vehicles and other systems, automatic controls are provided for the transmission which responds to the flow rate or consumption of fuel or the demand for electrical or other types of energy so that the fuel supply rate or the electric current supply is maintained within a predetermined range and upon exceeding the upper limit of this range, the transmission is automatically operated to reduce its output speed and increase the ratio of its input to its output speeds.

Such automatic control systems are expensive and, since they depend upon measurements of the fuel demand or energy use, are inexact. For example, they may respond to changes in environmental conditions such as temperature or operating efficiency and may give rise to unnecessary modifications in the transmission ratio. Furthermore, the response time of the system is slow so that the control frequently will not be effective before the primary energy source is brought to standstill or stalled.

OBJECTS OF THE INVENTION

It is the principal object of the present invention to provide an improved control system for a prime mover connected to a stepless transmission which avoids the disadvantages of the systems mentioned earlier.

Another object of this invention is to provide an arrangement for the automatic control of a variable-ratio stepless transmission connected to a driving source, such as an internal-combustion engine or electric motor, so as to prevent overloading of the latter and the stalling thereof.

SUMMARY OF THE INVENTION

These objects and others which will become apparent hereinafter are attained, in accordance with the present invention, in a system which comprises a prime mover, i.e. a driving source having an output shaft and adapted to convert electrical or fuel energy into mechanical work, and a stepless transmission (preferably a hydrostatic drive) having a control member which can be adjusted to vary the transmission ratio between the input shaft and an output shaft of this transmission, the drive shaft of the motor or engine being connected to the input shaft of the transmission.

According to this invention, the control system includes means for detecting the torque at a shaft between the primary energy source and the stepless transmission, and means responsive to this torque for shifting the control member of the transmission to reduce the output speed thereof upon the torque in the shaft reaching a predetermined limiting value. Thus when excessive load is applied to the engine to tend to stall it or reduce its speed excessively, the transmission is automatically adjusted to reduce its output speed and thereby decrease the loading of the engine.

The torque in the shaft between the engine and the stepless transmission can be relatively simply measured with considerable precision by any of a number of devices. Variations in the energy demand of the primary energy source, which are created by external factors and do not affect the output torque thus will have no effect upon the output "signal" of the torque-sensing or torque-measuring device. The term "signal" is used here in the generalized sense commonly employed in control technology to mean any parameter or action which can be detected or utilized as an input for a control circuit or a control device. The signal may be a mechanical displacement operating a valve or a mechanical-electrical transducer so that the ultimate output is an electrical signal which can control electrically responsive means such as an electromagnetic valve. The mechanical displacement may be converted into a pneumatic or hydraulic parameter for operation of a pneumatic or hydraulic device.

An important advantage of the present invention is that the control device need not be designed specifically for the primary energy source since it is effective with a shaft between the prime mover and the stepless transmission. It is therefore independent of the nature and construction of the primary energy source and one and the same control system or torque detector can be used for a variety of primary energy sources. Of particular advantage is the fact that the torque detector can be provided upon the input shaft of the hydrostatic transmission and the control system supplied to the user with this transmission for connection to a variety of types of prime mover.

For example, the same combination of control system and hydrostatic transmission can be connected to an electric motor, to a Diesel engine or to a gasoline engine having different types of energy supply without any variation in the construction of the control device. The piston engine may be of the type controlled by the mixture of the fuel with air, by the rate of fuel injection and/or by a speed governor. The control system can, furthermore, be produced by serial techniques in large quantities and may be stocked for use because of its universal application. The system need only be adjusted for the particular threshold response which may be required.

According to another feature of the invention, the steplessly adjustable transmission can be selectively set by hand or by a control device apart from the automatic control mentioned and the automatic control system may be applied, with a hydrostatic transmission, either only for the pump or only for the motor or for both the pump and the motor in accordance with conventional hydrostatic transmission principles. Consequently, either or both the pump or the motor may have a cylinder barrel with a plurality of axial pistons operating against an inclined control surface which may be pivoted relative to the axis of the barrel to adjust the effective piston stroke and hence the transmission ratio.

According to the invention, in the shaft between the primary energy source and the stepless transmission there is provided a torque-sensing device which is connected to a comparator adapted to compare the torque signal with a preset threshold value representing the limiting torque of the system. As the measured torque signal reaches or exceeds this threshold value, the comparator generates an output signal to operate the control member of the transmission in a direction corresponding to reduced output speed for as long as the measured torque signal exceeds the threshold value. When the measured torque signal falls below this threshold value, the control system effectively decouples from the control member of the transmission.

The predetermined threshold value of the torque can be established in various ways and may even lie within a specific range. It may be established in a standstill condition of the apparatus. The adjustment can be made before the apparatus is started or during its operation, manually by the operator or in response to some other parameter of the system.

Preferably, the threshold value is adjusted simultaneously with the setting of an operating condition of the primary energy source. Thus, for example, when the primary energy source is a piston-type internal combustion engine operating with mixture control and fuel injection, means is provided to vary the quantity of fuel injected per revolution of the engine or per working stroke. In this case, we provide means for raising the threshold or the limiting torque with adjustment of the engine for increased fuel injection.

The torque-measuring device comparator system can be of the continuous-response or ON-OFF type so that, for example, a bistable output is provided with a first condition (NO) representing normal operation of the system below the threshold and an instantaneous transformation to another condition (YES) when the threshold is exceeded and the pump of the stepless transmission must be adjusted.

The torque-measuring device can thus provide a continuous output or analog signal or a momentary output (digital signal) or an A-D (analog and digital) converter can be provided between the torque-measuring device and the comparator if required. The set point value may be an analog signal or a digital signal. The limiting or threshold value may be set directly at the torque-measuring instrument or may be provided in the form of an independent circuit element or control device. The control system may operate free from feedback so that, upon the seizing of control of the transmission in response to the torque the system can be independent of control supplied by the operator or any other parameter. In other words, the control lever of the transmission may remain in its low-speed position, when the detected torque exceeds the predetermined level until this torque is reduced regardless of operation of the controls by the operator to increase the output speed of the transmission.

Of course, it is also possible to provide for override of the automatic control system by the operator.

It has been found to be advantageous to provide means for first bringing the prime mover up to full operating output and then permitting the automatic control system to reduce the speed of the transmission, to provide for a fixed threshold value, or to provide for automatic nullification of the threshold value previously set when the torque excess no longer appears and the transmission is shifted into its normal operating mode.

According to still another feature of the invention, the output shaft of the prime mover may be connected to a number of loads, e.g. a power takeoff shaft in addition to the transmission for operation of further pumps, an air compressor or an electrical-current generator and in this case we provide the torque-measuring device between the primary energy source and the point at which the output thereof is branched to the respective loads so that the torque-measuring device responds to the sum of the torques assigned to each load.

When a stepless transmission is operated by a fluid medium under pressure, the control device may be provided directly in the fluid circuit and in this case a control pressure may be relieved as soon as measured torque reaches the limiting torque threshold.

The torque-measuring device may be pneumatic, mechanical, electrical or hydraulic, and may be provided in a coupling between the output shaft of the prime mover and the input shaft of the transmission.

Of particular advantage is a system in which a portion of a shaft is subjected to twisting under the applied torque and is formed with one or more strain gauges. A shaft between the prime mover and the transmission can be subdivided into two parts and the relative displacement at these parts can be transformed into an indication of torque at the junction between them. For example, the two members may be provided with arms or levers having a force-measuring element between them, e.g. a piezoelectric transducer between them.

The two parts may be connected by a thread or like helical formation and the axial force between them applied to a transducer.

The torque-measuring device may include a pressure capsule in place of the piezoelectric device where direct hydraulic control is desired.

Furthermore, the torque-measuring device can include a torsion spring which, upon attaining a predetermined twisting angle, opens a valve which preferably drops the control pressure in a suitable line of a hydraulic system.

We may also provide a clutch between two shaft parts so that the clutch members are relatively rotatable and which upon such relative rotation provides an output signal. The clutch may be of the friction type or of the saw type or may simply be a coupling having metallic springs joining two parts in which the springs are subject to distortion in response to the torque.

BRIEF DESCRIPTION OF THE DRAWING

The above and other objects, features and advantages of the present invention will become more readily apparent from the following description, reference being made to the accompanying drawing in which:

FIG. 1A is a detail of the controller of FIG. 1 in diagrammatic form;

FIG. 3 is an elevational view, partly broken away, of a torque-measuring device for use in the system of FIG. 1 or of FIG. 2;

FIG. 4 is an elevational view of another torque-measuring device according to the present invention;

FIG. 5A is an elevational view of yet another torque-measuring system, partly in diagrammatic form;

FIG. 5B is a view similar to FIG. 5A but taken at right-angles thereto;

FIG. 6 is an elevational view partly broken away showing still another torque-measuring device;

FIG. 7 is an elevational view in diagrammatic form of another embodiment of a torque-measuring device;

FIG. 8 shows still another device of this character in a similar view.

SPECIFIC DESCRIPTION

Figure 1:
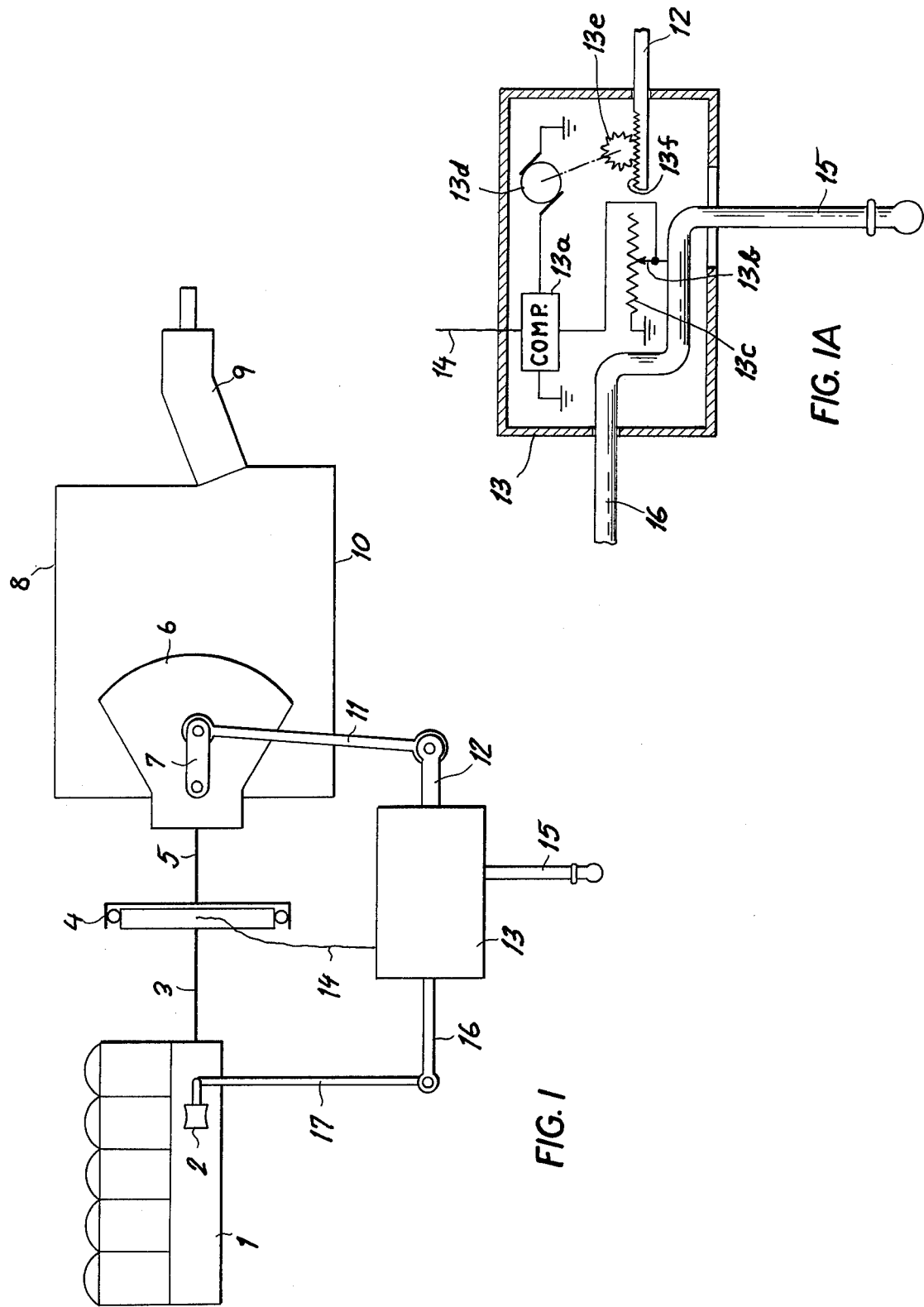
FIG. 1 is a diagram illustrating a control system according to the present invention.
Figure 2:
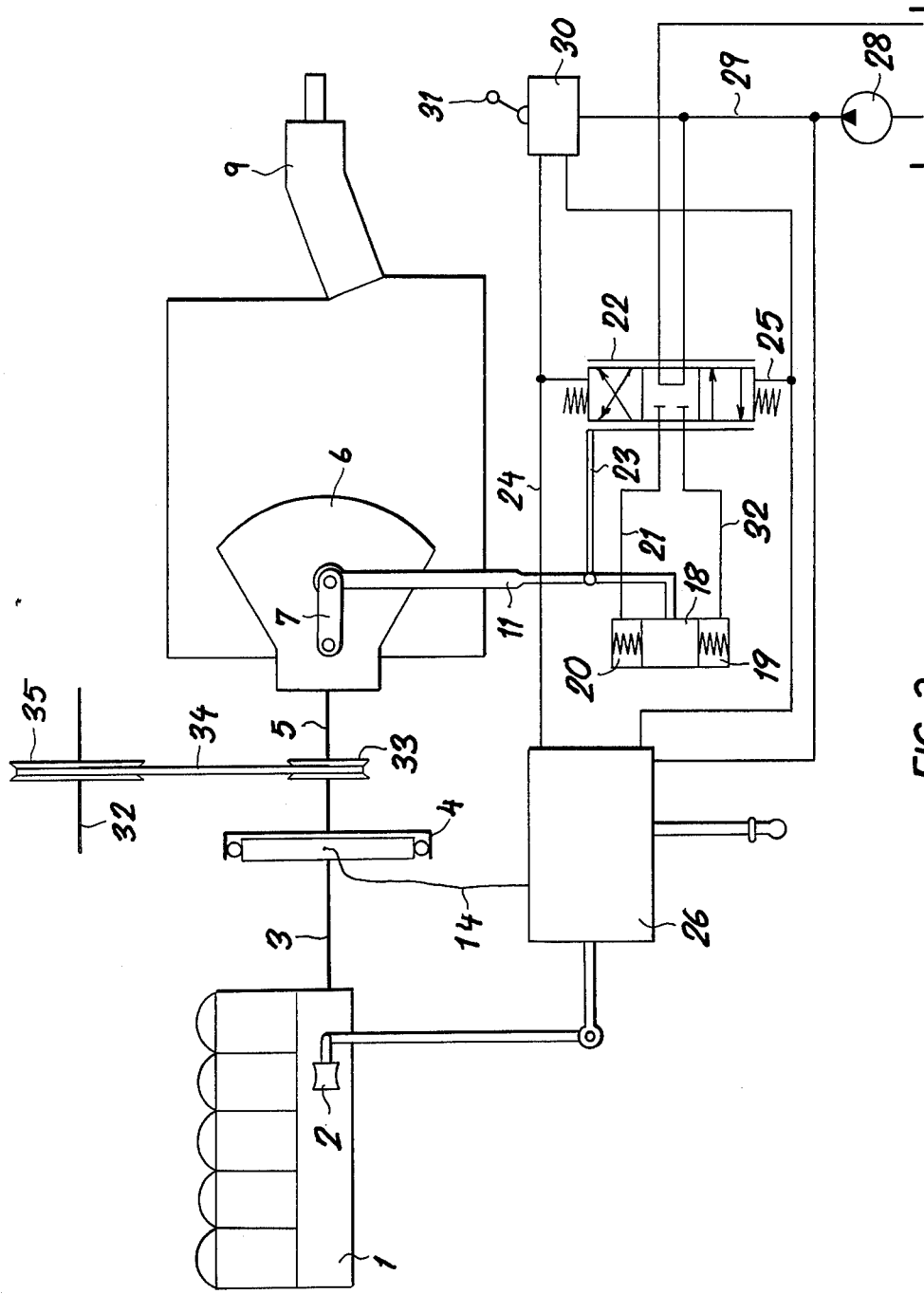
FIG. 2 is a diagram similar to FIG. 1 of another embodiment of the invention.

In FIGS. 1 and 2 of the drawing, a mechanical operation of the control member of a hydrostatic transmission has been illustrated in FIG. 1 while FIG. 2 relates to the system for using hydraulic or pneumatic control. In both FIGS., similar reference numerals are used to designate similar functioning parts.

In FIG. 1 we show a Diesel engine 1 having a fuel-injection controller 2 which, at each working stroke, injects fuel into the engine and thereby controls the torque delivered thereby. The output shaft or crankshaft 3 of the Diesel engine 1 is connected by a torque-measuring clutch 4 with the input shaft 5 of a variable-pump 6 of a hydrostatic transmission. Such transmissions are fully described in U.S. Pat. Nos. 3,681,919 issued Aug. 8, 1972 and No. 3,680,312 issued Aug. 1, 1972. The hydrostatic transmission has a control member or lever 7 which varies the effective stroke of the axial piston of the pump 6 so that the displacement volume per revolution of the axial piston pump can be varied by movement of the control lever 7. For a given load in the pump, as determined by the hydrostatic pressure, the displacement per revolution corresponds to a given stroke which is applied in the shaft 5.

Ducts 8 and 10 connect to the axial piston pump 6 in a closed circuit with the axial piston hydraulic motor 9, the output shaft of which may be connected to a suitable load. Typical loads include the driven wheels of a vehicle, the turntable of a crane, the drum of a windlass, the roller of a conveyor and the like. In general, hydrostatic transmissions are used between internal combustion engines of the type illustrated and practically any load operating with a continuous range of speed by rotation.

A link 11 articulates the lever 7 with a lever 12 whose position is determined by the controller 13. The controller is connected by loads 14 to the torque-measuring clutch 4 and receives an electrical signal representing the torque at the shafts 3, 5 and repositions the lever 12 upon the control signal from the torque-measuring clutch exceeding a threshold value established by displacement of the lever 15.

In operation the lever 15 is used to set a threshold value of the torque which can be sustained by the engine without a significant drop in speed and, when the measured torque exceeds this threshold value, lever 12 is displaced to operate lever 7 and shift this control member of the hydrostatic transmission in the direction of lower speed at its output shaft, i.e. the shaft of motor 9. This is accomplished by reducing the displacement of pump 6 per revolution.

The position of the injection controller 2 of the engine 1 is established by the lever 16 and the connecting rod 17 from the controller 13. When the lever 15 is displaced to adjust the threshold value, the lever 16 is correspondingly shifted to vary the fuel injection rate. The coupling 11, 12, 13, 16, 17 ensures that, with adjustments of the displacement per rotation of the pump 6, the fuel injector 2 will be correspondingly adjusted. With increasing torque thresholds, the displacement volume per revolution of the pump is increased and greater fuel flow is provided to permit high torque output.

The control device 13 is provided with a comparator which compares the signal provided by line 14 from the torque-measuring clutch 4 with the setting of the fuel injector 2. If, for a given setting of the fuel injector 2, the torque taken up by the pump 6 and the shaft 5 is excessive, the control device 13 becomes effective to actuate the lever 12 and reduces the displacement volume per revolution of the pump for a period sufficient to enable the torque detected by the clutch 4 to fall again below the threshold value.

Furthermore, when the signal delivered by line 14 indicates that the torque between shafts 3 and 5 is greater than that corresponding to the position of the fuel injector 2, the position of fuel injector is adjusted so that a greater fuel flow per working stroke is produced while pump 6 remains uneffected. Only when the fuel injector 2 has reached its maximum volume per working stroke and the torque detected by the torque-measuring clutch 4 exceeds the threshold value, will the controller 13 operate upon the pump 6 to reduce the displacement per revolution thereof.

In FIG. 1A we show a diagrammatic section through controller 13 of FIG. 1 and which comprises a comparator 13a in which the input signal derives from the leads 14, a set point signal is picked up by the wiper 13b connected to the setting lever 15 and operating upon a potientiometer 13c, the output of the comparator driving a servomotor 13d whose pinion 13e acts upon a rack 13f of the lever 12. Thus, as described, the lever 15 provides the set point or threshold for the comparator 13a and at the same time sets the lever 16 and the fuel injector 2.

In FIG. 2 we show another embodiment of the invention wherein the setting member or lever 7 of the pump 6 is operated by a rod 11 connected to the servopiston 18 of a fluid responsive servomechanism. The piston 18 is received between centering springs in a cylinder in which it defines a pair of pressurizable compartments 19 and 20. The central position of the piston 18 corresponds to the neutral position of the lever 7 and hence displacement per revolution of the pump.

Compartment 20 is connected by a duct 21 to a control valve 22 which also is connected by a duct 32 with a compartment 19. The control valve is of the three-position type and has a link 23 connecting the valve housing with rod 11 so that it constitutes the pilot valve of the servomechanism.

The valve member of valve 22 is biased into a central position with respect to its housing by a pair of springs each acting upon one end of the valve member so that the valve normally lies in the neutral position illustrated in which both ducts 21 and 32 are blocked and hydraulic fluid supplied by the pump 28 via line 29 is bypassed to the pump reservoir.

One end of the valve member is maintained at the pressure in line 24 while the other side of the valve member is maintained at the pressure in line 25. Lines 24 and 25 are connected to a pressure relief valve system represented diagrammatically at 26 which is supplied with pressure from pump 28 via line 29.

Line 29 also feeds the pressure-control valve 30 whose lever 31 is operable by hand and hence is selectively actuatable by the operator. Lines 24 and 25 are connected to valve 30 so that either may be pressurized by appropriate movement of the hand lever 31.

When line 24 is pressurized, the valve member of valve 22 is displaced downwardly to connect line 21 with the pump and line 32 with the reservoir. The piston 18 is thereby displaced downwardly to swing lever 7 out of its neutral position and render the pump 6 effective to displace fluid in one direction and rotate the motor 9 in a corresponding sense or when the lever 31 is actuated to pressurize line 25, the valve member of valve 22 is displaced upwardly, thereby connecting line 21 with the reservoir and line 32 with the pump. Compartment 19 is pressurized and compartment 20 is depressurized, thereby displacing the piston 18 upwardly and causing the lever 7 to swing in the opposite sense. Hence lever 31 provides manual control for the pump.

As previously described, the torque-measuring clutch 4 provides via line 14, a signal to the pressure relief valve system 26 which, upon the torque exceeding the predetermined limiting value, relieves the pressure in the line 24 or 25 then at the higher pressure to swing the lever 7 toward its neutral position and reduce the output of pump 6. Of course, the pilot valve 22 can be omitted in a simpler construction and lines 24 and 25 connected directly to the compartments 19 and 20.

The Diesel engine 1 has its output shaft provided further with a pulley 33 at the shaft 5, this pulley being connected by a belt 34 to a pulley 35 to drive another shaft or rod 32. Thus the output of the engine is branched to the hydrostatic transmission on the one hand and and to an auxiliary load on the other. In this case, the torque-measuring clutch 4 is provided between the output of the engine and the branching of the drive to the respective loads. In this case, the transmission ratio is varied even where the excessive load does not derive from the transmission although some of the torque approaches the limiting value.

In FIG. 3 we have shown a suitable torque-measuring device which comprises an auxiliary shaft 40 keyed at 41 to the output shaft 3 of the internal combustion engine. Member 40 is provided with a nonblocking thread which receives a threaded portion 42 of the input shaft 5 of the hydrostatic transmission, the latter shaft having a flange 43 to which one end 44 of a torsion spring 45 is anchored. The other end of the torsion spring is anchored to member 40.

Member 40 is capable of moving axially relative to shaft 3 as represented by the arrow A and has a flange 46 provided with a circumferential groove 47 into which projects a fork 48 guided by means not shown but movable within the yoke 49 of a pressure relief valve 50 which may be equivalent in function to the valve 26 of FIG. 2. The play of the yoke 49 may be adjusted by abutment screws 51.

Member 40 acts as a coupling between shafts 3 and 4 and, with increasing torque, will be rotated slightly relative to shaft 5 against the force of the torsion spring and hence will be displaced axially. When this axial displacement exceeds the torque threshold determined by the adjustment of screws 51, the valve will be operated to adjust the pump lever as previously described. This mechanical arrangement provides direct operation of a valve from the torque-measuring coupling as distinct from an electrical torque-measuring clutch as has been described in connection with FIGS. 1 and 2.

In the embodiment of FIG. 4, a shaft 52, connected by any conventional means to the output shaft of the motor, is formed with a portion 53 adapted to be twisted and having a helical configuration, and is connected by a flanged coupling 54 with a shaft 5. On the twistable portion 53 of this shaft, there is mounted a strain gauge strip 55 whose terminals are connected to slip rings 56 and 57 carried by the shaft 52 and cooperating with brushes 58 and 59 which, in turn, are connected to a comparator 60, e.g. a conventional strain gauge bridge to which a set-point signal or reference (threshold) is applied as represented by the block 61. The output of the comparator may operate the electromagnet 62 of a magnetically operated relief valve 63 performing the function of the pressure relief valve 26 previously described.

FIGS. 5A and 5B show another torque-measuring coupling between the shaft 3 and the shaft 5. In this case, the coupling comprises a pair of members 65 and 66, each connected to one of the shafts and each having a pair of laterally extending arms 67, 68, piezoelectric crystals 69 being connected between the juxtaposed arms of the two members. The output of the piezoelectric crystals are applied to slip rings 70 and 71 which cooperate with brushes 72, 73. The brushes may be connected to a comparator as previously described. The piezoelectric crystals are under increasing compression with increasing torque and hence have higher outputs which may be compared with a threshold value as previously described.

In the system of FIG. 6, a piezoelectric body 74 is provided between an end 75 of the shaft 5 which is threaded into a sleeve 76 mounted upon the shaft 3, and the bottom 77 of the sleeve. The output of the piezoelectric crystal is applied to slip rings 78 and 79 as previously described. As the torque in the shaft system 3, 5 increases, relative rotation of the sleeve 76 and shaft 5 results so that the piezoelectric crystal is placed under axial compression and delivers a signal representing the torque to the control system.

Another system generally similar to that of FIG. 3 in which a valve may be operated directly has been shown in FIG. 7. In this embodiment, shaft 3 is splined so that a disk 80 is axially displaceable thereon against the force of a torsion spring 81 connected to a flange 82 of shaft 5. A groove 83 in the disk 80 receives the valve fork as described in connection with FIG. 3. As the torque on the system of FIG. 7 increases, the disk 80 is shifted axially to operate the valve.

Finally, in FIG. 8 we show a torque-measuring clutch which comprises an axially fixed clutch plate 85 which can be mounted upon the shaft 5 or a shaft connected thereto and provided with the slip rings 86 and 87 which cooperate with brushes 88 and 89. The flange 85 is lined with a high-friction material 90 which engages the clutch lining 91 of an axially movable disk 92 splined at 93 to the shaft 3. A compression spring 94 urges the disk 92 toward the disk 85.

Disk 85 is provided with a plurality of coils shown diagrammatically at 95 which cooperate with permanent magnets 96 of disk 92 upon relative movement of the two halves of the clutch indicative of increasing torque transmission through the system. The interaction of the magnetic field and the coil produces an output signal which is supplied to a comparator as previously described.

We claim:

1. A system comprising a prime mover having an output shaft; a steplessly adjustable transmission having an input shaft operatively connected to said output shaft of said prime mover, and an output shaft operatively connectible to a load, and control means for varying the speed ratio between the input and output shafts of said transmission; torque-measuring means between said prime mover and said transmission for directly detecting the torque at the output shaft of said prime mover; and means responsive to the torque-measuring means for operating said control means upon the measured torque attaining a predetermined limiting value to reduce the speed of the output shaft of said transmission.

2. The system defined in claim 1 wherein said transmission is a hydrostatic drive and said means responsive to the torque-measuring means includes a comparator having a selective set-point input establishing a threshold corresponding to said predetermined limiting value.

3. The system defined in claim 1 wherein said limiting value is determined by a threshold directly set at said torque-measuring means.

4. The system defined in claim 1 wherein said prime mover has means for controlling the energy input thereto, said system further comprising means for establishing said limiting value and for operating said means for controlling said energy input.

5. The system defined in claim 1, further comprising means for controlling the energy input to said prime mover whereby said speed of the output shaft of said transmission is adjusted only upon the attainment of maximum energy input to said prime mover.

6. A system comprising a prime mover having an output shaft; a steplessly adjustable transmission having an input shaft operatively connected to said output shaft of said prime mover, and an output shaft operatively connectible to a load and control means for varying the speed ratio between the input and output shafts of said transmission; torque-measuring means between said prime mover and said transmission for detecting the torque at the output shaft of said prime mover; and means responsive to the torque-measuring means for operating said control means upon the measured torque attaining a predetermined limiting value to reduce the speed of the output shaft of said transmission, said transmission being a hydrostatic drive and said means responsive to the torque-measuring means including a hydraulic control valve, said torque-measuring means including a torsion spring twistable for operation of said valve.

7. A system comprising a prime mover having an output shaft; a steplessly adjustable transmission having an input shaft operatively connected to said output shaft of said prime mover, and an output shaft operatively connectible to a load, and control means for varying the speed ratio between the input and output shafts of said transmission; torque-measuring means between said prime mover and said transmission for detecting the torque at the output shaft of said prime mover; means responsive to the torque-measuring means for operating said control means upon the measured torque attaining a predetermined limiting value to reduce the speed of the output shaft of said transmission; and a further load coupled to said output shaft of said prime mover, said torque-measuring means being provided between said prime mover and both said transmission and said further load.

8. A system comprising a prime mover having an output shaft; a steplessly adjustable transmission having an input shaft operatively connected to said output shaft of said prime mover, and an output shaft operatively connectible to a load, and control means for varying the speed ratio between the input and output shafts of said transmission; torque-measuring means between said prime mover and said transmission for detecting the torque at the output shaft of said prime mover; and means responsive to the torque-measuring means for operating said control means upon the measured torque attaining a predetermined limiting value to reduce the speed of the output shaft of said transmission, said torque-measuring means including a pair of relatively rotatable members connected respectively to the output shaft of said prime mover and the input shaft of said transmission for generating a signal upon relative rotation of said members.

9. A system comprising a prime mover having an output shaft; a steplessly adjustable transmission having an input shaft operatively connected to said output shaft of said prime mover, and an output shaft operatively connectible to a load, and control means for varying the speed ratio between the input and output shafts of said transmission; torque-measuring means between said prime mover and said transmission for detecting the torque at the output shaft of said prime mover; and means responsive to the torque-measuring means for operating said control means upon the measured torque attaining a predetermined limiting value to reduce the speed of the output shaft of said transmission, said torque-measuring means including a twistable shaft having a strain gauge strip mounted thereon.

10. In a control device for a stepless transmission connected to a load and driven by a shaft connected to a prime mover wherein the transmission ratio is altered in a direction reducing the output speed upon approaching maximum loading of the prime mover, the improvements which comprise means for directly measuring the torque in said shaft; and means responsive to the torque-measuring means for controlling said transmission ratio.

11. The improvement defined in claim 10 wherein said control device includes means for comparing a measurement derived from said torque-measuring means with a predetermined threshold value and varying said transmission ratio upon the measured torque exceeding said threshold value.

12. The improvement defined in claim 11, further comprising means for varying the threshold value.

13. The improvement defined in claim 12 wherein the threshold value is adjustable directly on said torque-measuring means.

14. The improvement defined in claim 12 wherein said means for comparing comprises a comparator for a set point value and a measured value, said threshold value being introduced as said set point value.

15. The improvement defined in claim 12 wherein said prime mover is adjustable, further comprising means for modifying said threshold value in accordance with the adjustment of said prime mover.

16. The improvement defined in claim 10 wherein said transmission has a setting device unaffected by said torque-measuring means.

17. The improvement defined in claim 10, further comprising means for selectively varying said ratio independently of said torque-measuring means.

18. The improvement defined in claim 10 wherein said control device has a control characteristic whereby, upon attaining a threshold value of said torque at which said ratio is adjusted, first the prime mover is set at maximum output and thereafter at said maximum output, said ratio is adjusted.

19. The improvement defined in claim 10 wherein a second load is connected to said shaft, the torque-measuring means being provided between said prime mover and the point at which said second load is connected to said shaft.

20. The improvement defined in claim 10 wherein said transmission is a hydrostatic transmission having a pressure-responsive device including a control valve responsive to said torque-measuring means for adjusting the pressure supplied to the latter device.

21. The improvement defined in claim 10 wherein said torque-measuring means includes a twisted portion of said shaft provided with torque-measuring strips.

22. The improvement defined in claim 10 wherein said torque-measuring means includes a lever arm acting upon a force-measuring element and connected to said shaft.

23. The improvement defined in claim 10 wherein said torque-measuring means includes a force-measuring element disposed between two threadedly interconnected portions of said shaft.

24. The improvement defined in claim 10 wherein said torque-measuring means includes a torsion spring acting upon a pressure-relief valve.

25. The improvement defined in claim 10 wherein said torque-measuring means includes a clutch having a pair of relatively rotatable portions and means responsive to relative rotation of said portions for producing an output representing the measured torque.

* * * * *